(12) United States Patent
Goto et al.

(10) Patent No.: US 6,209,511 B1
(45) Date of Patent: Apr. 3, 2001

(54) LEAN COMBUSTION GAS ENGINE

(75) Inventors: Satoru Goto; Yoshifumi Nishi; Sadao Nakayama; Takeyuki Sakagami, all of Tokyo (JP)

(73) Assignee: Niigata Engineering Co., Ltd., Tokyo (JP)

( * ) Notice: Subject to any disclaimer, the term of this patent is extended or adjusted under 35 U.S.C. 154(b) by 0 days.

(21) Appl. No.: 09/307,899

(22) Filed: May 10, 1999

(30) Foreign Application Priority Data

May 14, 1998 (JP) .................................................. 10-132371
Aug. 12, 1998 (JP) .................................................. 10-228416

(51) Int. Cl.⁷ ............................. F02B 19/10; F02M 51/00
(52) U.S. Cl. .......................... 123/256; 123/267; 123/275
(58) Field of Search .................................... 123/256, 266, 123/267, 273, 275, 287

(56) References Cited

U.S. PATENT DOCUMENTS

| | | | | |
|---|---|---|---|---|
| 3,154,058 | * | 10/1964 | Warren | 123/267 |
| 3,905,343 | * | 9/1975 | Ryan | 123/267 |
| 4,254,741 | * | 3/1981 | Werling et al. | 123/267 |
| 4,332,224 | | 6/1982 | Latsch et al. | 123/254 |
| 4,765,293 | * | 8/1988 | Gonzalez | 123/275 |
| 4,831,982 | * | 5/1989 | Baranescu | 123/275 |
| 5,050,550 | * | 9/1991 | Gao | 123/275 |
| 5,060,610 | * | 10/1991 | Paro | 123/275 |
| 5,479,903 | | 1/1996 | Werner et al. | 123/509 |
| 5,887,566 | * | 3/1999 | Glauber et al. | 123/275 |

FOREIGN PATENT DOCUMENTS 40 42 325 A1    5/1991   (DE).
2 393 938        1/1979   (FR).

* cited by examiner

Primary Examiner—Willis R. Wolfe
(74) Attorney, Agent, or Firm—Fish & Richardson P.C.

(57) ABSTRACT

The present invention relates to a lean combustion gas engine which receives a drive output by means of supplying and combusting gas fuel in a main combustion chamber. The lean combustion engine of the present invention comprises: a main combustion chamber (1) which is surrounded by a piston (3), a cylinder (2) and a cylinder head (4); a precombustion chamber (30) equipped with a pilot fuel injection valve; and a spark plug (11) which serves as an ignition source for the fuel-air mixture within the main combustion chamber; wherein, the spark plug and pilot fuel injection valve-equipped precombustion chamber are provided in said cylinder head.

8 Claims, 13 Drawing Sheets

IV : INTAKE VALVE
IGV : INTAKE GAS VALVE
EV : EXHAUST VALVE

| NUMBERS | 1 PLUG | 2 PLUGS |
|---|---|---|
| SPARK PLUG A | ◯ | ◯ |
| SPARK PLUG B | ✕ | ◯ |

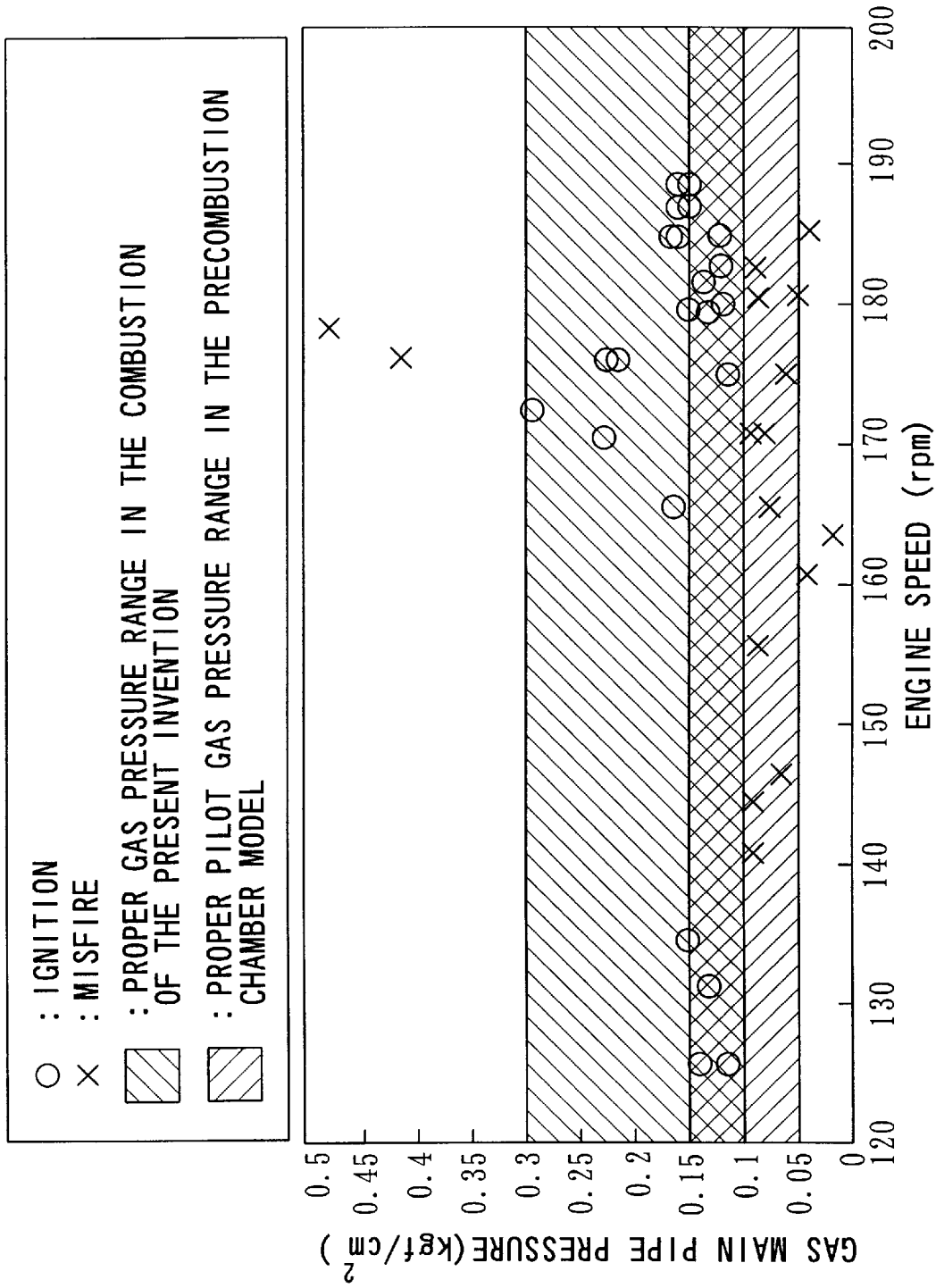

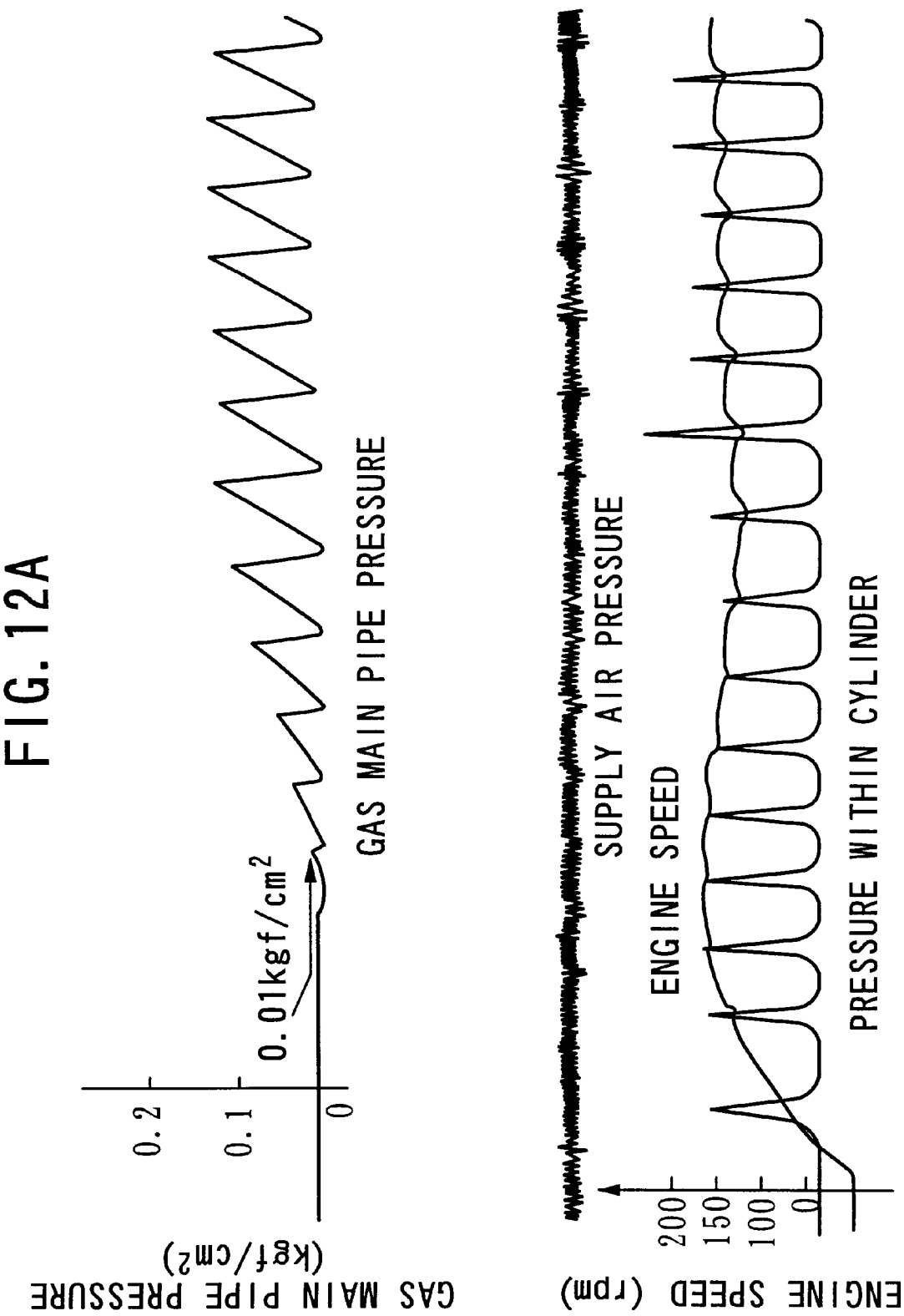

LEAN COMBUSTION GAS ENGINE

BACKGROUND OF THE INVENTION

1. Field of the Invention

The present invention relates to a lean combustion gas engine which is useful mainly as a driving source for a stationary-type electrical power facility for industrial or commercial use. This application is based on patent applications No. Hei 10-132371 and No. Hei 10-228416 filed in Japan, the contents of which are incorporated herein by reference.

2. Relevant Art

In recent years, more attention has been paid towards lean combustion gas engines, due to their low pollution properties. The main trend is for conventional lean combustion gas engines to take the form of the precombustion chamber-type model, which uses spark plugs as the ignition source; however, dual fuel engines are known to function as the aforementioned as well. The latter type of engine performs the combustion of gas fuel by means of injecting a pilot fuel (liquid) directly into the main combustion chamber in the amount of approximately 5~15% of the entire heating amount, and uses this pilot fuel as the ignition source. More concretely, a small amount of pilot fuel is injected from the main fuel injection valve of a standard diesel engine in order to achieve the aforementioned ignition. It is also achieved by the injection of 100% liquid fuel from the main fuel injection valve to switch in a diesel operation from in a gas operation.

However, when combusting a lean mixture using a conventional spark plug-equipped precombustion chamber-type gas engine, unless a strong ignition energy is generated, fluctuation of the combustion with misfire occurs In addition, when comparing this process with that performed by the diesel engine with an identical cylinder bore, the aforementioned process is advantageous from the standpoint of low pollution with a NOx concentration of approximately one-tenth the latter, however, the aforementioned process is also disadvantageous from the standpoint of exhibiting a low engine thermal efficiency.

With regard to improving the combustion fluctuation, in order to ensure a dependable combustion within the precombustion chamber, numerous research is being conducted into measures for optimizing the spark plug position within the precombustion chamber, and for creating a uniform distribution of the fuel-air mixture within the aforementioned precombustion chamber. However, since neither of the above increases the ignition energy, there exist limits with regard to improving the engine thermal efficiency and combustion fluctuation.

On the other hand, in the case of a gas mode operation of conventional dual fuel engines, disadvantages that the exhaust amount of the NOx concentration and the soot and dust are increasing, at increasing the pilot fuel to improve the engine thermal efficiency and suppress the combustion fluctuation, such that the advantageous low pollution (low $CO_2$) properties of the gas engine cannot be exploited Meanwhile, in the case of reducing the amount of the pilot fuel, at the cranking speed (approximately 150~200 rpm) at the time of starting the engine, it is not possible to sufficiently raise the fuel pump ejection pressure, and the pressure is unable to exceed the injection-valve opening pressure, such that fuel injection is not possible. Consequently, another mechanism is required for starting the gas engine which uses the pilot fuel as the ignition source.

SUMMARY OF THE INVENTION

Accordingly, the present invention provides a lean combustion gas engine which receives a drive output by means of supplying and combusting gas fuel in a main combustion chamber, said engine comprising: a main combustion chamber which is surrounded by a piston, a cylinder and a cylinder head; a precombustion chamber equipped with a pilot fuel injection valve; and a spark plug which serves as an ignition source for a fuel-air mixture within said main combustion chamber, wherein, said spark plug and pilot fuel injection valve-equipped precombustion chamber are provided in said cylinder head.

According to the present invention, it is possible to start said lean gas engine by means of spark-ignition from said spark plug. Alternatively, according to the lean combustion gas engine of the present invention, combustion of the fuel-air mixture within said main combustion chamber may be performed using said spark plug-equipped precombustion chamber and pilot fuel injection valve-equipped precombustion chamber as ignition sources by means of operating said spark plug-equipped precombustion chamber and said pilot fuel injection valve-equipped precombustion chamber at approximately the same time, slightly before or slight after one another during the same combustion cycle.

In addition, the aforementioned spark plug may be positioned within a spark plug-equipped precombustion chamber provided in said cylinder head.

Furthermore, in the lean combustion gas engine according to the present invention, an extremely compact pump compared to pumps used in conventional diesel engines, can be used as a fuel injection pump, which connects to said pilot fuel injection valve of said pilot fuel injection valve-equipped precombustion chamber, since the quantity of pilot oil is an extremely small. Therefore, the fuel injection pump can be installed in a door of said crankcase cam chamber without large scale redesign.

BRIEF DESCRIPTION OF THE DRAWINGS

FIG. 11 is a diagram showing the fuel gas pressure conditions for starting the engine.

FIG. 12A is a diagram showing an example of state in which the engine is started according to the engine of the present invention.

DETAILED DESCRIPTION OF THE PREFERRED EMBODIMENTS

In the following, the embodiments of the present invention will be explained in detail with reference to the figures.

First Embodiment

Figure 1:
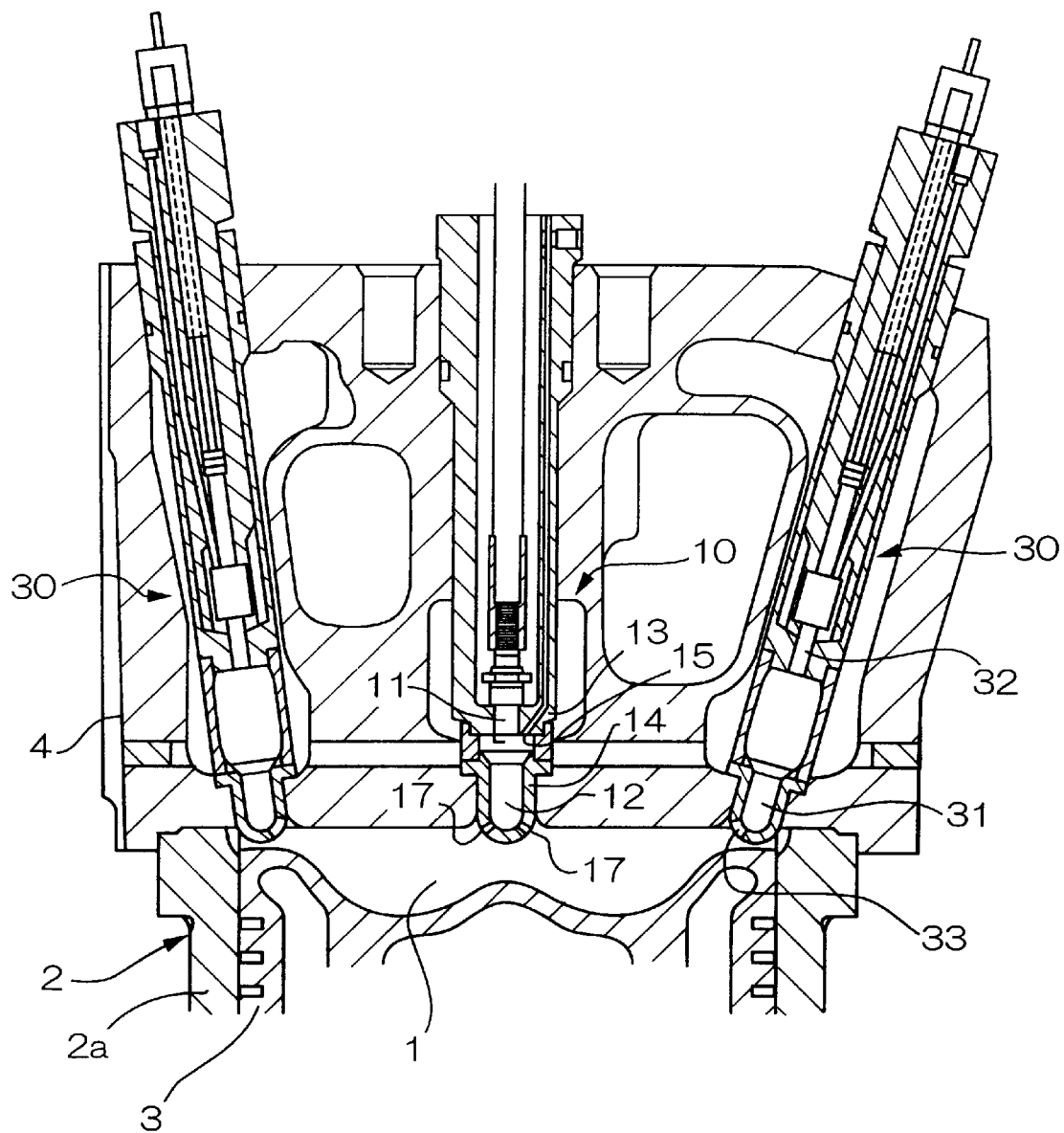
FIG. 1 is a diagram showing a cross-sectional side view of the essential components of a gas engine according to a first embodiment of the present invention.

FIG. 1 is a cross-sectional side view showing the cylinder head portion of a gas engine according to a first embodiment of the present invention. In the figure, a cylinder 2, cylinder liner 2a, piston 3, cylinder head 4, and main combustion chamber 1 are provided. The main combustion chamber 1 is surrounded by the piston 3, cylinder liner 2a and cylinder head 4. A spark plug-equipped precombustion chamber unit 10 is formed in the center of the cylinder head 4, and one precombustion chamber unit 30 equipped with a pilot fuel injection valve is provided on each side thereof.

The precombustion chamber unit 10 equipped with a spark plug (hereinafter referred to as simply "spark plug-equipped precombustion chamber") is constructed by combining the cylinder head 4 with a precombustion chamber body 14 and a precombustion chamber foundation 13. A fuel gas (pilot gas) is directly supplied to the precombustion chamber 12, which is housed within the precombustion chamber body 14, via fuel injection port 15. The main combustion chamber 1 and precombustion chamber 12 communicate via a plurality of connection ports 17, which are provided on the lower end of the precombustion chamber 12 as a jet nozzle. In addition, the precombustion chamber foundation 13 is equipped with a spark plug 11 which serves as an ignition source for the fuel-air mixture within precombustion chamber 12. Furthermore, in order to suppress the NOx of the exhaust gas to an extremely low level, the volume ratio (percentage of the entire combustion chamber volume at the top dead center during compression) of the precombustion chamber 12 must be controlled at approximately a few percent.

With regard to the precombustion chamber unit 30 equipped with pilot fuel injection valve (hereafter referred to as simply "pilot fuel injection valve-equipped precombustion chamber"), the pilot fuel injection valve 32, which ignites the fuel-air mixture within the precombustion chamber 31 by means of injecting a pilot fuel, is installed facing towards the inside of the precombustion chamber 31. In addition, the main combustion chamber 1 and precombustion chamber 31 communicate by means of a single or plurality of connection ports 33, which are provided on the lower end of the precombustion chamber.

In the case when starting the engine, the spark plug-equipped precombustion chamber unit 10 is used as the main ignition source. In other words, a diesel start is not conducted, and thus it is possible to decrease the size of the pilot fuel injection valve-equipped precombustion chamber unit 30. Furthermore, by means of limiting the pilot oil amount to approximately 0.2~5% of the entire heating amount, it is possible to decrease the volume percentage of the precombustion chamber 31 to approximately 1~3% of the entire combustion chamber volume. Consequently, a pilot fuel injection valve-equipped precombustion chamber unit 30 can be arranged on each side of the cylinder head 4. This aspect differs greatly from the 20~30% volume percentage occupied by the precombustion chambers of a conventional precombustion chamber-type diesel engine.

Figure 2:
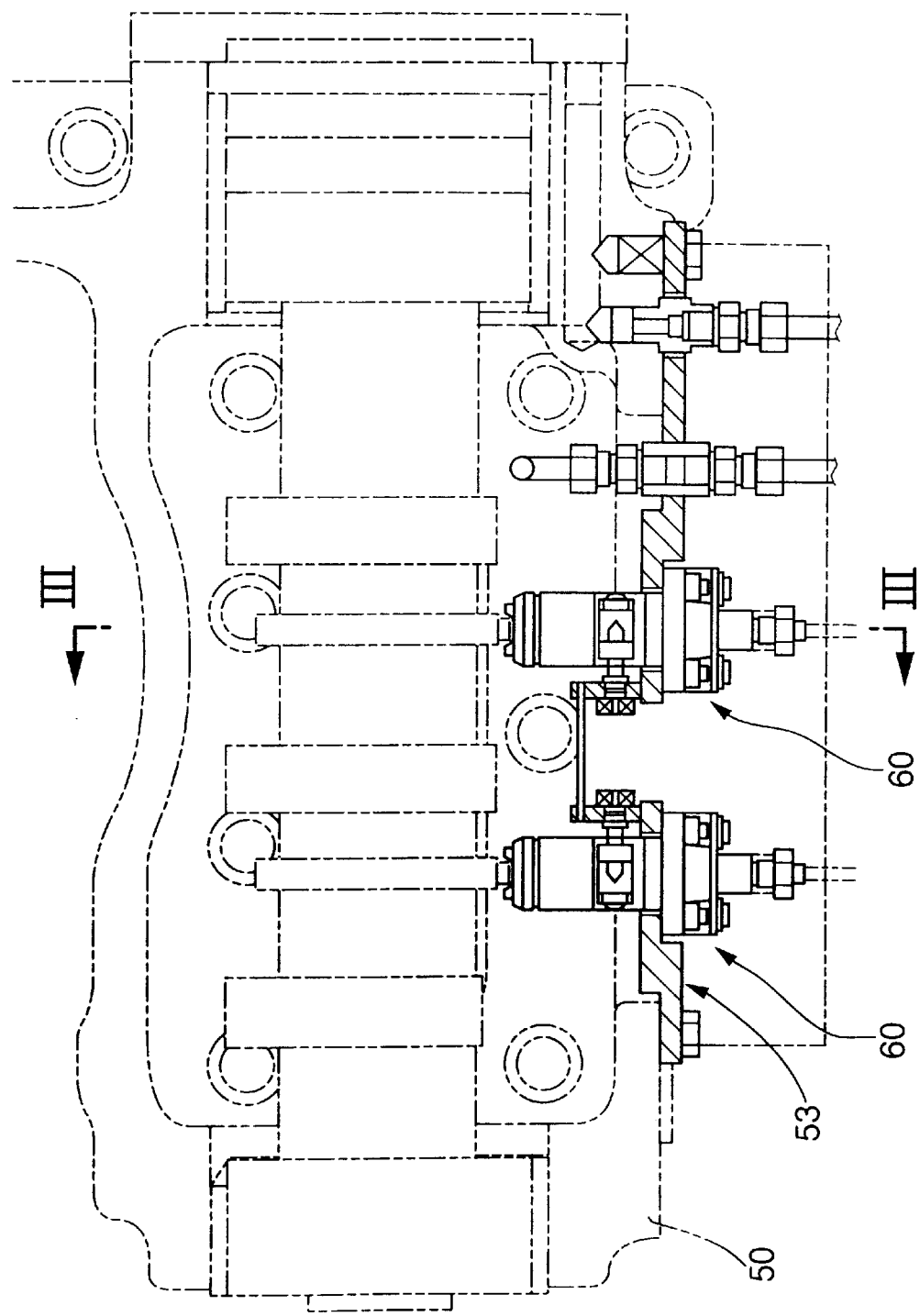
FIG. 2 is a plane view diagram showing the installed state of a fuel injection pump in the gas engine according to a first embodiment of the present invention.
Figure 3:
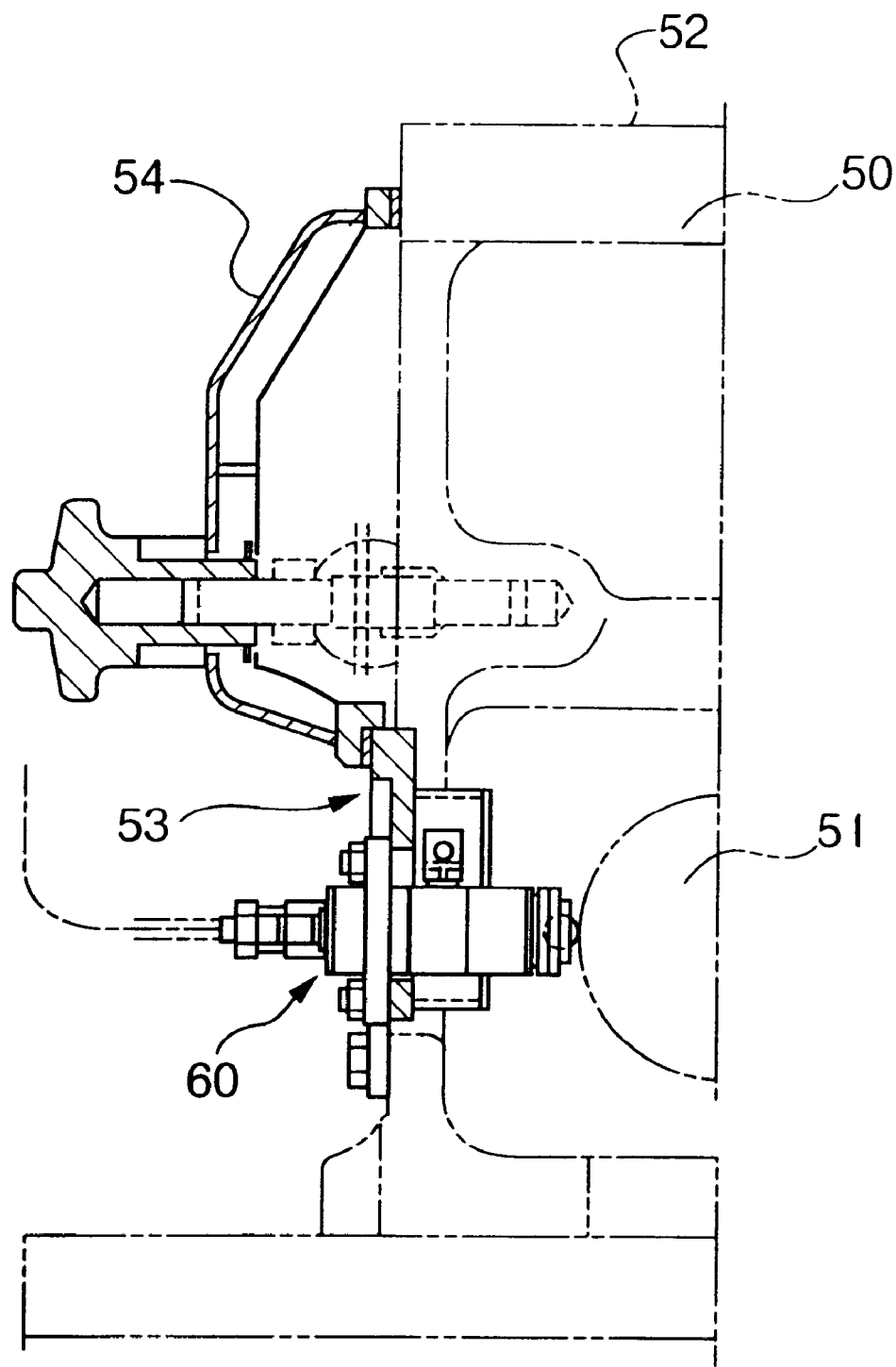
FIG. 3 shows a view along the arrow III—III of FIG. 2.

Additionally, as shown in FIGS. 2 and 3, the fuel injection pump which connects to the pilot fuel injection valve 32 is installed in the door of the crankcase cam chamber. In FIGS. 2 and 3, a crankcase 50, cam shaft 51, crankcase top surface 52, cam shaft door 53, cam surface inspection window 54, and fuel injection pump 60 are provided, with fuel injection pump 60 being provided in cam shaft door 53. According to the present embodiment, an extremely compact fuel injection pump 60 can be installed when compared to pumps used in conventional diesel engines, since the quantity of pilot oil is an extremely small amount of approximately 0.2~5% with respect to the rated injection amount when assuming diesel operation. In this design, the fuel injection pump 60 can be installed without performing any particular modification of the crankcase.

In the following, each of the various operational modes that the aforementioned lean combustion gas engine is capable of executing will be explained.

There are four possible operational modes:
(1) A spark ignition precombustion chamber-type gas engine;
(2) A pilot ignition gas engine;
(3) A dual ignition gas engine, namely spark ignition and pilot ignition.

The aforementioned operation modes may be optionally selected A plurality of ignition sources and processes exist; moreover, the aforementioned are provided in parallel, thereby increasing the reliability of the ignition source.

(1) Operational mode for spark-ignition:

According to this operational mode, only gas fuel (gas) is used as the fuel, and the spark plug-equipped precombustion chamber is employed as the ignition source for the fuel-air mixture comprising air and the gas fuel within the main combustion chamber.

More concretely, from the second-half of the exhaust process to the first-half of the intake process, a pilot gas is supplied from the fuel injection port 15 of the spark plug-equipped precombustion chamber unit 10 to precombustion chamber 12. This pilot gas is supplied by means of the pressure difference between the pressure in the pilot gas header (not shown in the figure) and the pressure within main combustion chamber 1; the amount of the pilot gas is adjusted by means of changing the aforementioned pressure difference.

Additionally, during the intake stroke, the lean mixture comprising the fuel gas and air is supplied to the main combustion chamber 1. This lean mixture within the main combustion chamber 1 is compressed in the compression stroke by means of piston 3. As a result, a portion of the lean mixture flows into precombustion chamber 12 via connection port 17. At this time, the fuel gas within precombustion chamber 12 and lean mixture are mixed, such that the average excess air ratio reaches approximately 1.0. At this point, a spark discharge is generated in the gap between spark plugs 11, and the fuel-air mixture within precombustion chamber 12 is spark-ignited. The flame combusted in precombustion chamber 12 is then propragated to the main combustion chamber 1 via connection port 17, thereby forming the ignition source for the fuel-air mixture in the main combustion chamber 1. As a result, all of the fuel-air mixture within the main combustion chamber 1 is combusted.

(2) Operational mode for ignition by means of pilot fuel injection:

According to this operational mode, gas is used as the main fuel and, as an auxiliary fuel a small amount of liquid fuel is used as the pilot fuel. During the intake stroke, the lean mixture comprising the fuel gas and air is supplied to the main combustion chamber 1. This lean mixture within the main combustion chamber 1 is compressed in the compression process by means of piston 3. As a result, a portion of the lean mixture flows into precombustion chamber 31 via connection port 33. At this point, immediately before the top dead center where the crank angle becomes approximately 10~30°, a small amount of fuel oil (pilot oil) is injected into the precombustion chamber 31 from the pilot fuel injection valve 32. When this occurs, the injected fuel is ignited, and then serves as the ignition source for ignition-combustion of the fuel-air mixture. The flame from the combustion in precombustion chamber 31 is then propagated to the main combustion chamber 1 via connection port 33, thereby forming the ignition source for the fuel-air mixture in the main combustion chamber 1. In this manner, all of the fuel-air mixture within the main combustion chamber 1 is combusted.

Figure 4:
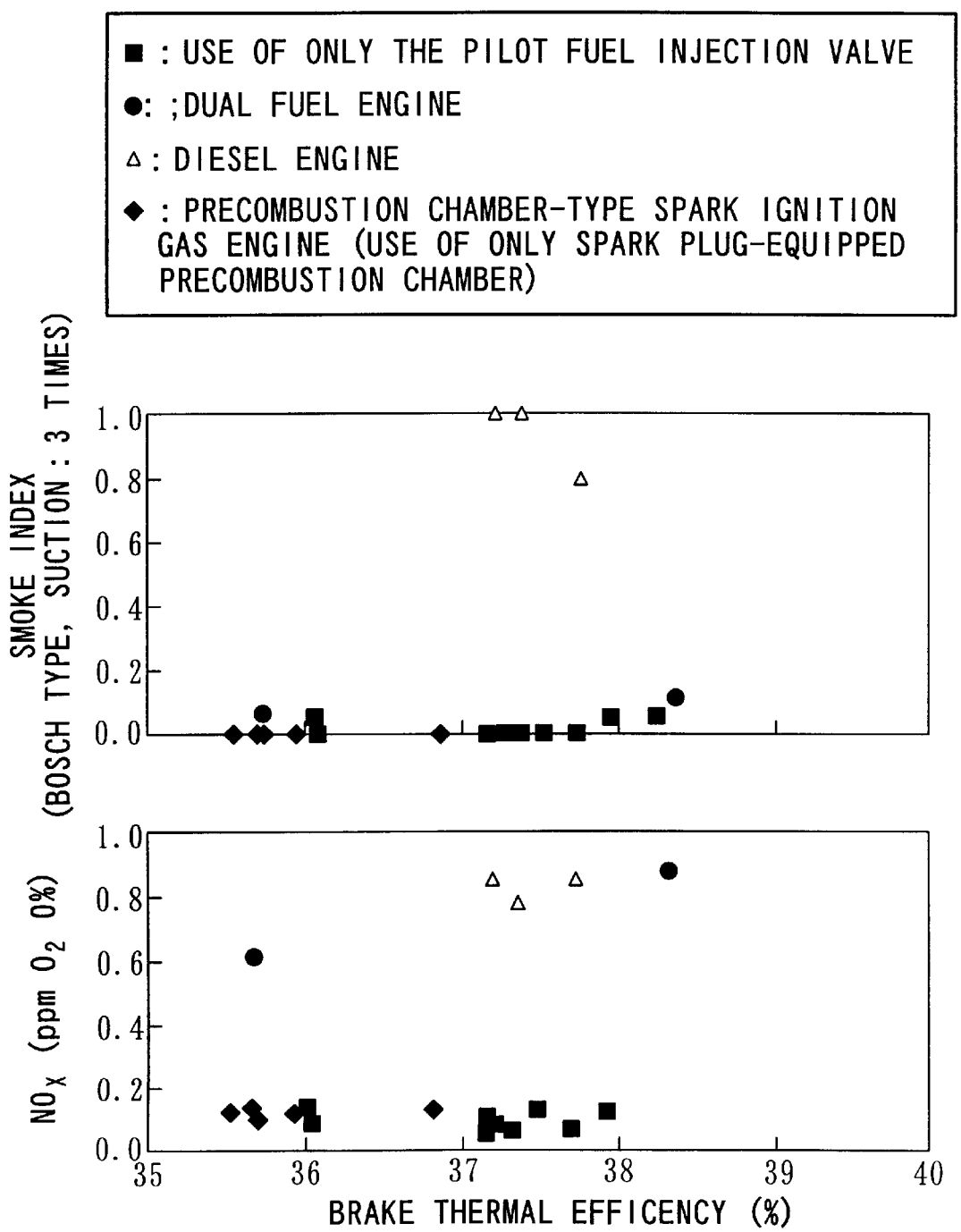
FIG. 4 is characteristic diagram for explaining the performance of the gas engine according to the present invention

In FIG. 4, using the aforementioned engine, the results (relations between brake thermal efficiency and NOx, and smoke index) of conducting performance experiments while changing the amount of pilot fuel oil are compared and shown using each type of fuel model (dual fuel engine, diesel engine, precombustion chamber-type spark-ignition gas engine). As seen from FIG. 4, according to the aforementioned engine of the present invention, even in the case of pilot fuel injection, exhaust gas properties (i.e., NOx, and smoke index) at a level approximately equivalent to that of spark-ignition gas engines are achieved, along with a thermal efficiency which is higher than that of spark ignition and at the same level as that of a diesel engine.

Furthermore, in the case of pilot fuel injection, a pilot gas for the spark plug-equipped precombustion chamber unit 10 becomes unnecessary. In addition, since the pilot oil amount can be limited to approximately 0.2~5% of the entire heating amount, there are no adverse effects imparted to the governing even when conducting continuous injection. Consequently, it is possible to fix the rack of the fuel injection pump, thereby rendering complex link mechanisms unnecessary. Lastly, the governing (speed control) during engine operation is conducted by adjusting the fuel gas amount by means of the engine governor.

(3) Hybrid ignition gas engine operational mode:

According to this operational mode, in the same combustion cycle, the fuel-air mixture with the main combustion chamber 1 is combusted by means of operating a central spark plug-equipped precombustion chamber unit 10 and the pilot fuel injection valve-equipped precombustion chamber units 30, located at each side thereof as the ignition sources at approximately the same timing or alternatively before or after each other. In this manner, it is possible to promote combustion of the fuel-air mixture using multipoint ignition. Furthermore, by means of optimally adjusting (1) the spark ignition period of these ignition sources, (2) the period of pilot fuel injection, and (3) the injection amount, it is possible to improve the combustibility of the fuel-air mixture and also improve the thermal efficiency secondary to shortening the combustion period.

Figure 5A:
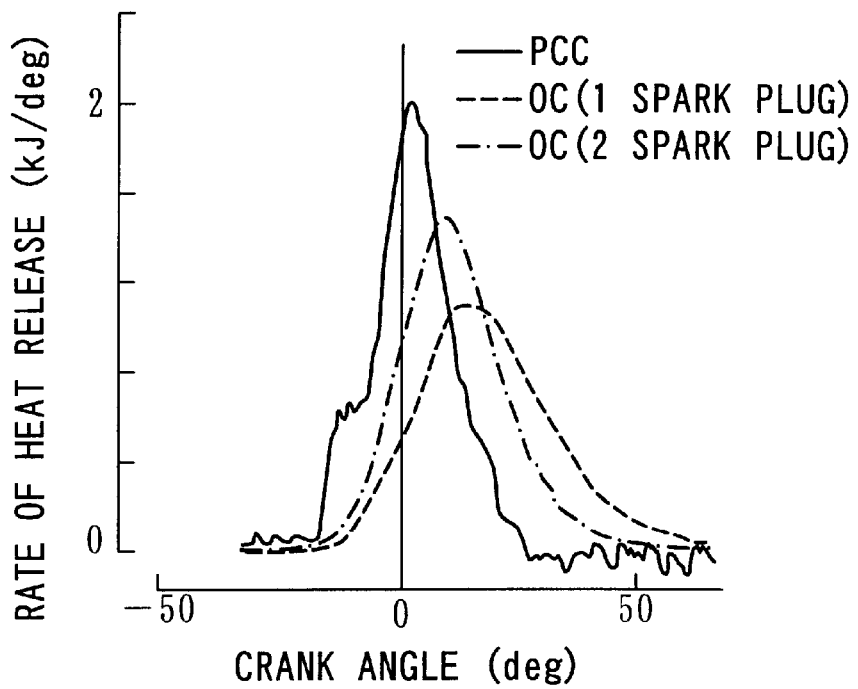
FIG. 5A is characteristic diagram for explaining the performance of the engine according to the present invention, and compares the rate of heat release of a single combustion chamber model and precombustion chamber model.
Figure 5B:
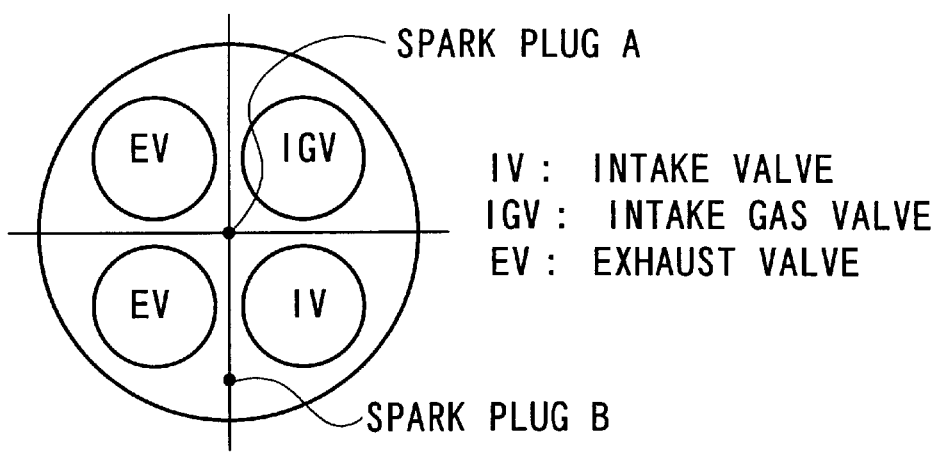
FIG. 5B is a plane view diagram showing the spark plug arrangement in the engine used in FIG. 5A

The effects of shortening the combustion period by means of multipoint ignition in the case of operating in the hybrid ignition gas engine mode are also supplemented FIG. 5A is a diagram showing the experimental results obtained when comparing the rate of heat release from a single combustion chamber method (method involving only a main combustion chamber without a precombustion chamber) and a precombustion chamber method (i.e., as in the case of the present example). In FIG. 5A, both a precombustion chamber method PCC, and single combustion chamber method OC are shown. In the case of an OC, a further comparison is made comparing the case of one spark plug (OC (1 spark plug)) and two spark plugs (OC (2 spark plugs)). At the time of the experiment, the first and second spark plugs A, B were respectively positioned centrally and to the side, as shown in FIG. 5B. In the case of a single spark plug, only the central spark plug A was used, while in the case of two spark plugs, both spark plugs A and B were employed.

The patterns of the rate of heat release shown in FIG. 5A indicate that the multipoint ignition (i.e., in the case of 2 spark plugs) as well as the energy generated from a strong ignition (i.e., in the case of using a precombustion chamber PCC as the ignition source) are effective in achieving a rapid combustion. In other words, when two spark plugs are employed (represented by the alternating long-short dashed lines in the figure), after the top dead center, the heat release is completed by the time the crank angle nears 40°, which represents a shorter combustion period when compared to that obtained with a single spark plug (represented by the dashed line in the figure). In addition, according to a precombustion chamber method (represented by the continuous line in the figure) possessing an even stronger ignition energy, after the top dead center, the heat release is completed by the time the crank angle nears 30°, which represents an even shorter combustion period Consequently, as seen from the present embodiment, it is possible to achieve a rapid combustion by means of arranging multiple ignition sources (e.g., arranging three precombustion chambers) possessing a strong ignition energy. In addition, a shorter combustion period contributes to an improvement of the thermal efficiency, and thus the thermal efficiency is also improved.

Incidentally, when comparing the ignition energies, in the case of using only spark plugs, approximately 0.1 J are generated; however, in the case of the pilot injection, when the oil in the pilot fuel is 1% of the entire heating amount, the energy generated is approximately 600 J. This indicates that the multipoint ignition produced by the spark plug-equipped precombustion chamber 10 and pilot fuel injection valve-equipped precombustion chambers 30 contribute tremendously to the improvement of the combustion.

In actuality, after starting the engine using the spark plug ignition, it is desirable to jointly use the spark plug ignition and pilot injection ignition during loading. Accordingly, it is possible to maintain the low NOx, take advantage of the low pollution of the gas engine, and achieve a high engine thermal efficiency. However, there are no problems with the operation, even when stopping the spark ignition during loading.

Furthermore, in the present embodiment, an arrangement is described in which the spark plug-equipped precombustion chamber unit 10 is positioned centrally, with the pilot fuel injection valve-equipped precombustion chamber units 30 arranged on each side thereof However, it is also possible to position the pilot fuel injection valve-equipped precombustion chamber unit 30 centrally, and arrange a spark plug-equipped precombustion chamber units 10 on each side thereof.

However, in the engine according to the aforementioned embodiment, there are cases in which a misfire may occur. This is due to the fact that the flame core, formed by means of the sparks flying over the space between the spark plugs 11, may be extinguished since the lean mixture, penetrating into precombustion chamber 12 from the main combustion chamber 1, directly hits the spark plugs 11 at a speed of approximately 100 n/s during the compression stroke. In order to solve this problem, the concentration of the fuel-air mixture in the vicinity of the spark plugs 11 must be tightly regulated. However, nonuniformity of the fuel-air mixture concentration secondary to penetration of the lean mixture into the precombustion chamber 12 from the main combustion chamber 1 cannot be avoided, and hence, the difficulties with ignition still remain as before.

Figure 6:
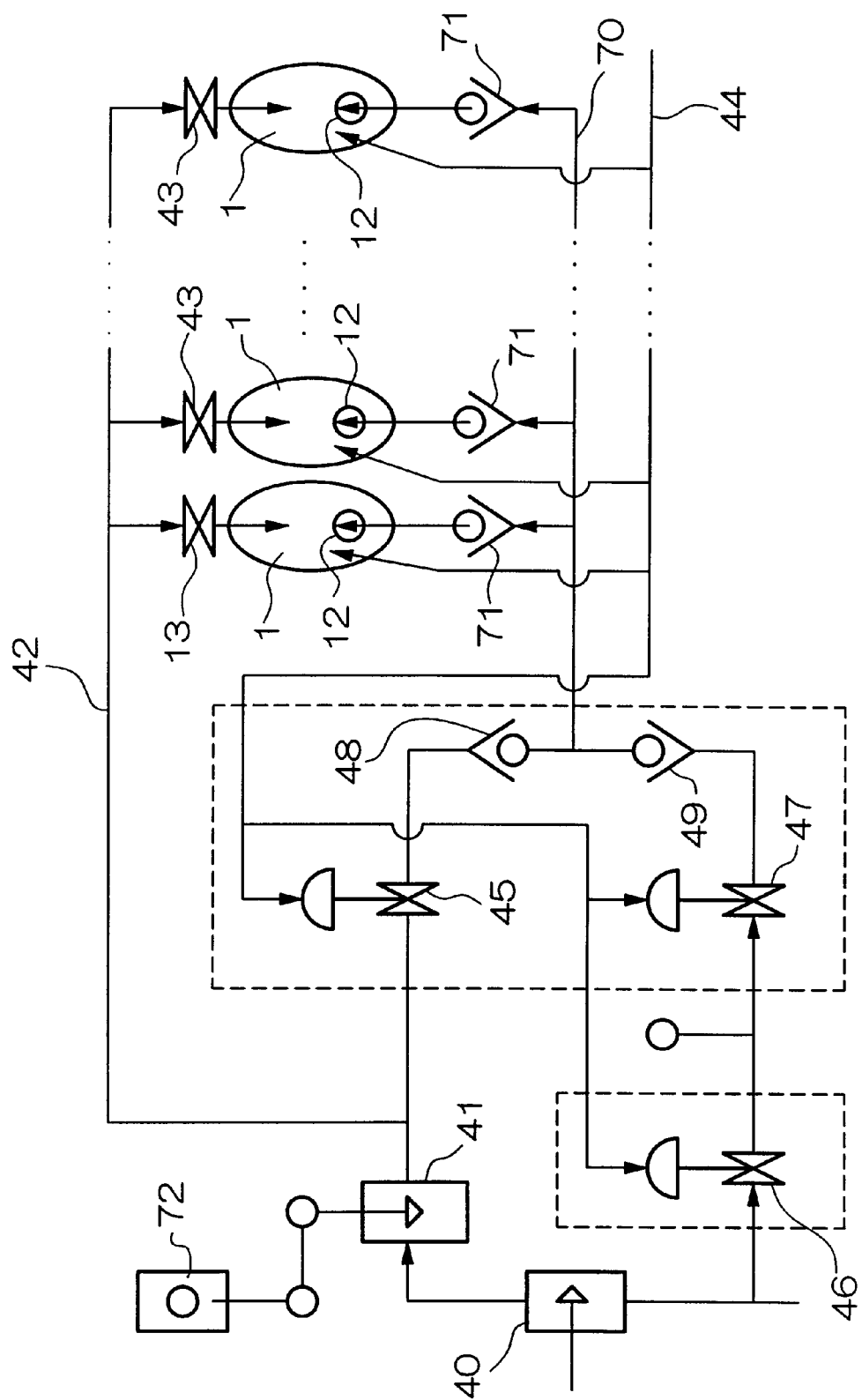
FIG. 6 is a diagram showing an example of a fuel gas pressure control system in the engine of the present invention.

FIG. 6 shows an example of a control mechanism for regulating the fuel gas amount. According to this structure, a main fuel gas pipe 42 equipped with two gas pressure regulator valves 40, 41 communicates with the main combustion chamber 1 via balancing valve 43; the main pipe 70 of the pilot gas, regulated via pressure regulators 45, 46, and 47 and check valves 48 and 49, communicates with the precombustion chamber 12 via a check valve 71. In addition, air is supplied into the main combustion chamber 1 from charge air manifold 44. A charge air pressure in the charge air manifold 44 is loaded to the pressure regulators 45, 46, and 47 to serve a control function. In addition, the gas pressure regulator valve 41 is controlled by means of the governor 72.

Figure 7:
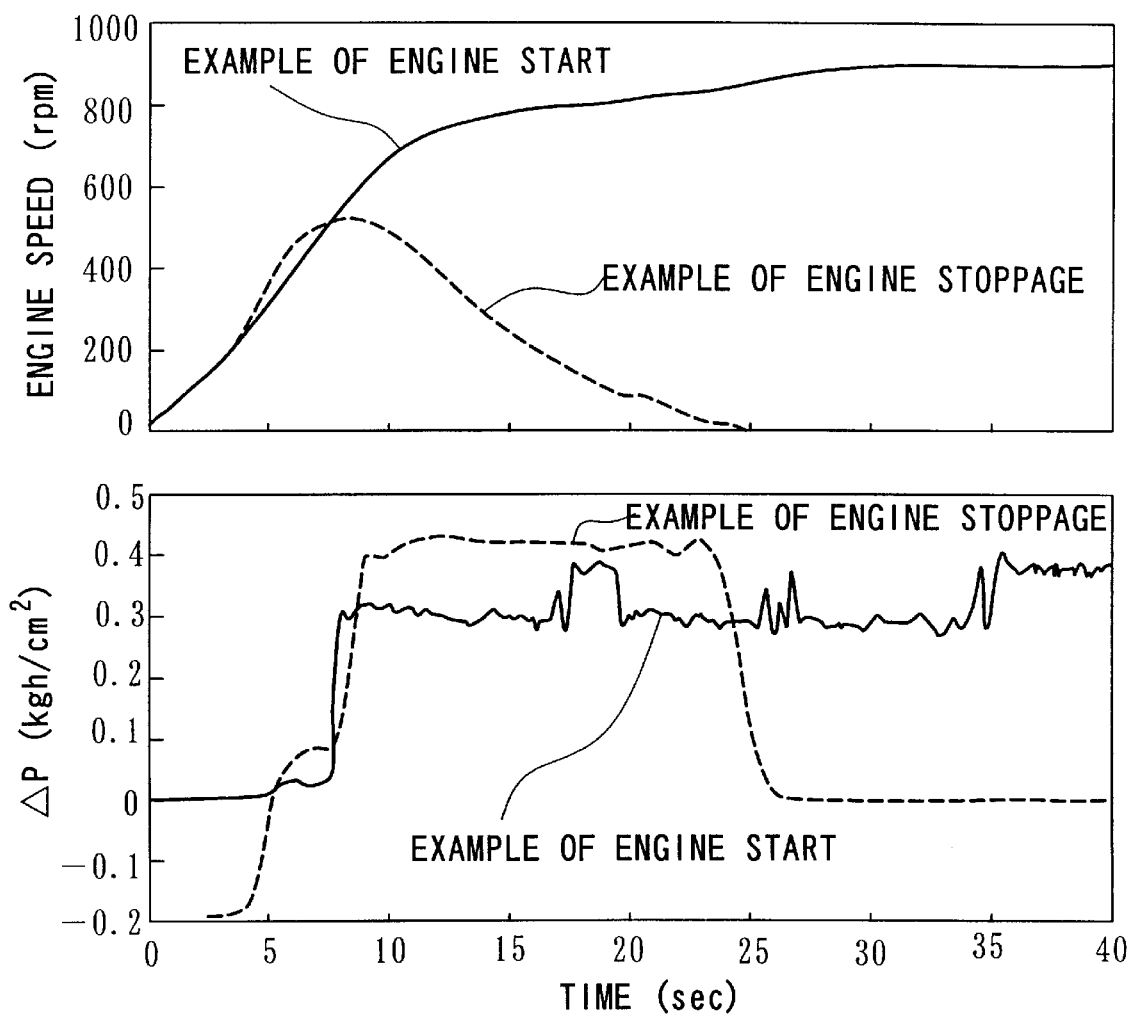
FIG. 7 is a diagram showing an example of engine stoppage at the time of starting engine.

In the mechanism possessing the aforementioned structure, when the fuel gas amount (i.e., the pilot gas amount) supplied directly to precombustion chamber 12 is unsuitable, the engine may stop due to a misfire which may occur even during the rise in the engine speed, as shown in FIG. 7. An example of engine stoppage is shown in FIG. 7, in which, at approximately 500 rpm, the engine stops secondary to an increase in the fuel-air mixture concentration in the vicinity of the spark plugs 11 leading to a misfire from the influx of a large amount of pilot gas into the precombustion chamber (i.e., $\Delta P$, which represents the pressure difference between the pressure of the pilot gas main pipe 70 and the pressure of the charge air manifold 44 in the structure shown in FIG. 6, is high).

Therefore, in order to prevent this engine stoppage from a misfire, and ensure the smooth starting of the engine, the inventors of the present invention have proposed the engine described below in the second embodiment.

Second Embodiment

Figure 8:
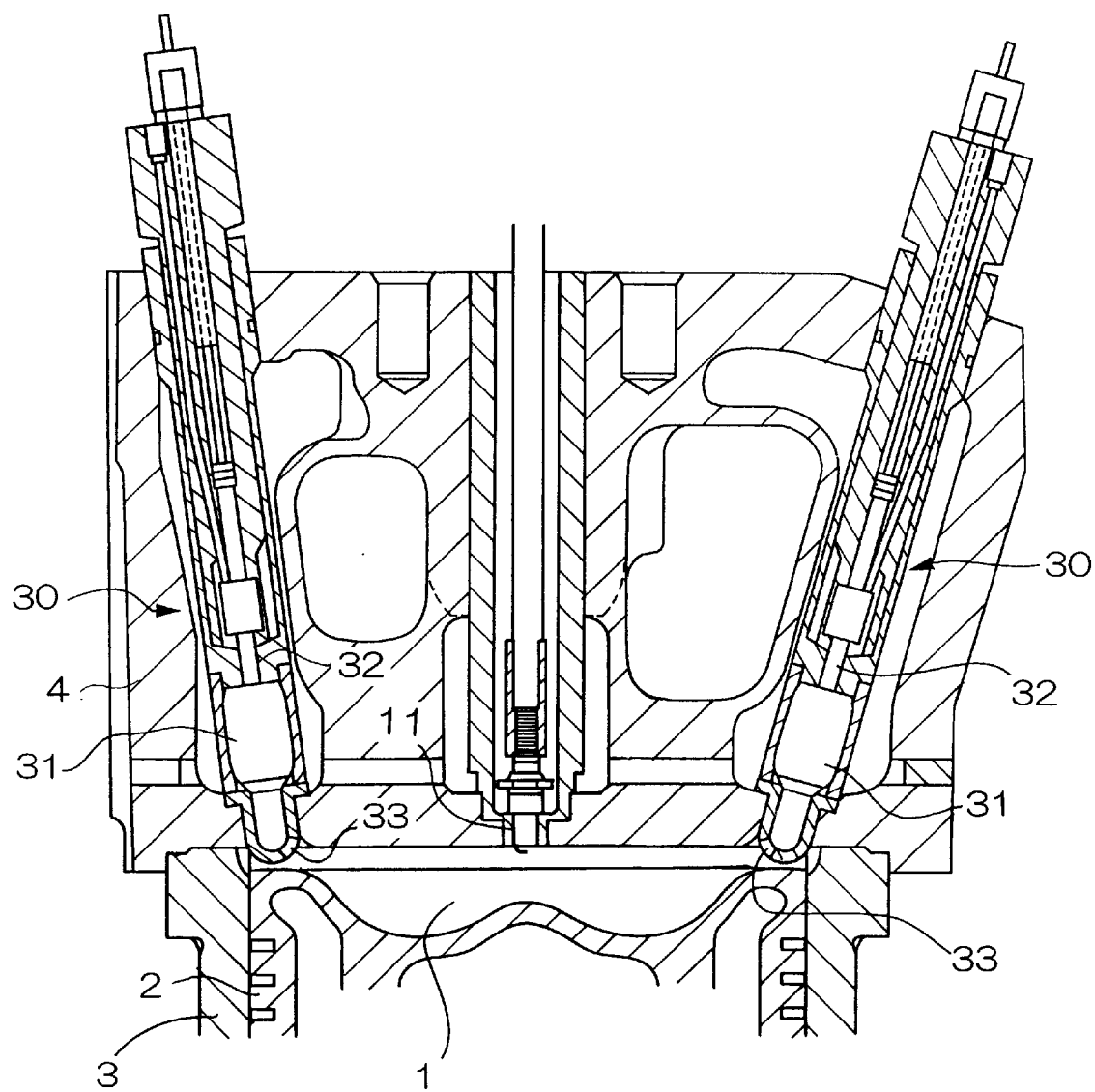
FIG. 8 is a diagram showing a cross-sectional side view of the essential components of a gas engine according to a second embodiment of the present invention.
Figure 9:
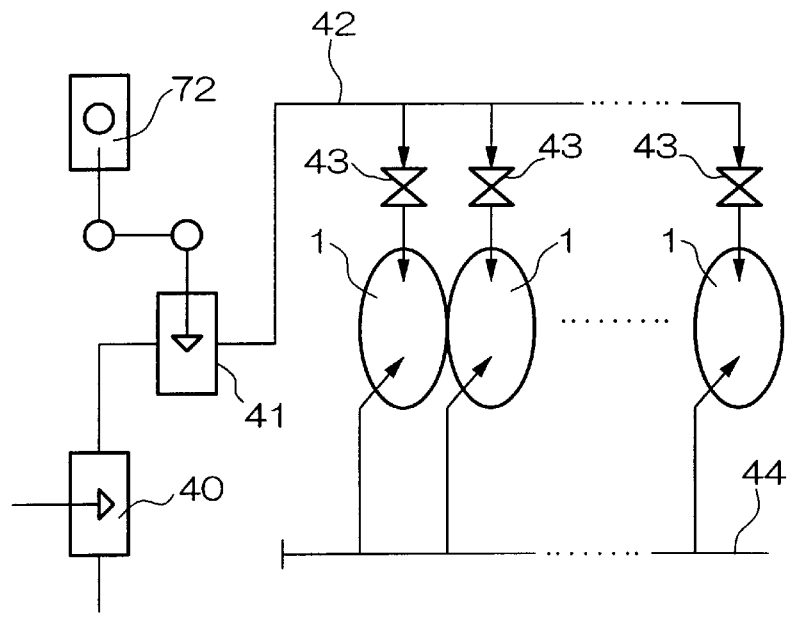
FIG. 9 is a diagram showing an example of a fuel gas pressure control system in the engine of the present invention.

The second embodiment according to the present invention is shown in FIGS. 8 and 9. In these figures, the elements having the same structures as those shown in FIGS. 1~6 are denoted by the same numerals, and their explanations are omitted.

In FIG. 8, in the center of the cylinder head 4, a spark plug 11 is arranged on the surface of the main combustion chamber 1 with a precombustion chamber 31 equipped with pilot fuel injection valve 32 arranged respectively on each side thereof. In addition, the regulation of the fuel gas amount is performed by means of a simplified mechanism shown in FIG. 9. In comparison to the engine of the first embodiment, the engine of the present embodiment differs in having a spark plug 11 arranged in the center of the cylinder head 4 in the absence of ancillary equipment (e.g., precombustion chamber foundation 13, precombustion chamber body 14, fuel injection port 15 and connection ports 17), and in lacking a pilot gas supply system (pressure regulators 45, 46, and 47; check valves 48, 49 and 71; and pilot gas main pipe 70), which is rendered unnecessary.

Furthermore, in the present embodiment, an arrangement is described in which the spark plug 11 is positioned centrally, with the pilot fuel injection valve-equipped precombustion chamber units 30 arranged on each side thereof. However, it is also possible to position the pilot fuel injection valve-equipped precombustion chamber unit 30 centrally, and arrange a spark plug 11 on the side thereof.

Figure 10:
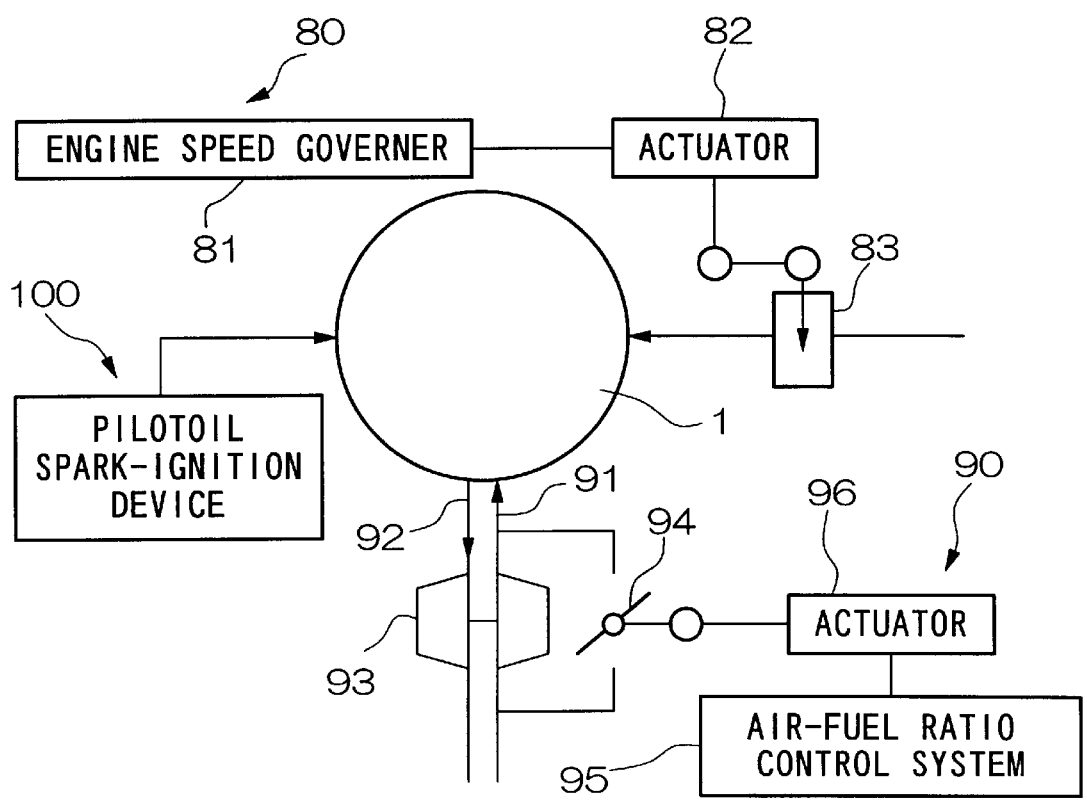
FIG. 10 is a block diagram showing the operational control system in the engine of the present invention.

FIG. 10 shows an operational control mechanism for governing the engine of the present invention. In FIG. 10, a spark-ignition device which uses a spark plug 11, and a pilot fuel injection valve-equipped precombustion chamber unit 30 which utilizes pilot oil, are jointly employed in the ignition source 100. According to the fuel gas control system 80, the fuel gas amount is adjusted by regulation of the gas pressure regulator valve 83 by means of the engine speed governor 81 via actuator 82. In addition, according to the manifold pressure control system 90, an exhaust turbocharger 93 is provided between the air supply system 91 and exhaust system 92. In this system, regulation of the manifold pressure regulator valve 94, which is provided in the air supply system 91 in parallel to the exhaust turbocharger 93, is conducted by means of air-fuel ratio control apparatus 95 via actuator 96.

In the case of this engine, the engine is started using spark plug 11. In other words, there is no diesel start, and thus, in the same manner as the engine of the first embodiment, it is possible to provide a compact pilot fuel injection valve-equipped precombustion chamber unit 30. In addition, the pilot fuel injection system operates from the time of starting the engine. However, in actuality, the start of the injection depends on the pilot oil amount, i.e., the established valve of the rack of fuel injection pump, and for example, may begin from the point when the engine speed reaches 900~1000 rpm, in the case when the pilot oil percentage comprises 1% of entire heating amount. In this case, there is no impact on the governing even during continuous injection since the pilot oil proportion comprises approximately 0.2~5% of entire heating amount. Consequently, due to the injection amount, it is possible to fix the rack of the aforementioned fuel injection pump, without using complex link mechanisms.

According to the engine possessing the aforementioned structure, at the time of starting the engine, the fuel-air mixture comprising the gas fuel and air supplied into the main combustion chamber 1 is ignited without fail using spark-ignition from spark plug 11. As a result, the engine is started smoothly without stoppage of the engine during the starting. At this time, the pilot fuel injection system is in operation, however, since the engine has not reached a predetermined engine speed, it neither ignites nor functions as an ignition source.

Subsequently, when the engine reaches a predetermined engine speed set with respect to an established pilot oil amount (i.e., according to the rack of the fuel injection pump), ignition is commenced by means of pilot fuel injection according to the same process as in the pilot injection operational mode (2) of the first embodiment. Hence, the ignition based on the pilot fuel injection occurs without fail and once the aforementioned operation is capable of serving as the ignition source, the spark discharge may be stopped without consequence. Additionally, continuing the aforementioned spark discharge results in promotion of the combustion by means of multipoint ignition as in the case of the first embodiment.

FIG. 11 is a diagram obtained by means of evaluating for the proper fuel gas pressure at the time of starting the engine according to the present embodiment. As seen clearly from FIG. 11, in contrast to a proper fuel gas pressure of 0.05~0.15 $kgf/cm^2$ at the time of starting the engine in the precombustion chamber model, the proper fuel gas pressure level according to the formula of the present invention displayed a higher level and wider range of 0.1~0.3 $kgf/cm^2$. Consequently, according to the present invention, when compared with the precombustion chamber model, it is possible to control the engine start using a simple apparatus, as strict control using a pressure control device is unnecessary. Furthermore, since the fuel-air mixture concentration within the main combustion chamber 1 is approximately uniform due to the flow turbulence effect of the entire combustion chamber that is produced during the intake compression stroke, ignition using spark plug 11 become much easier.

Figure 12B:
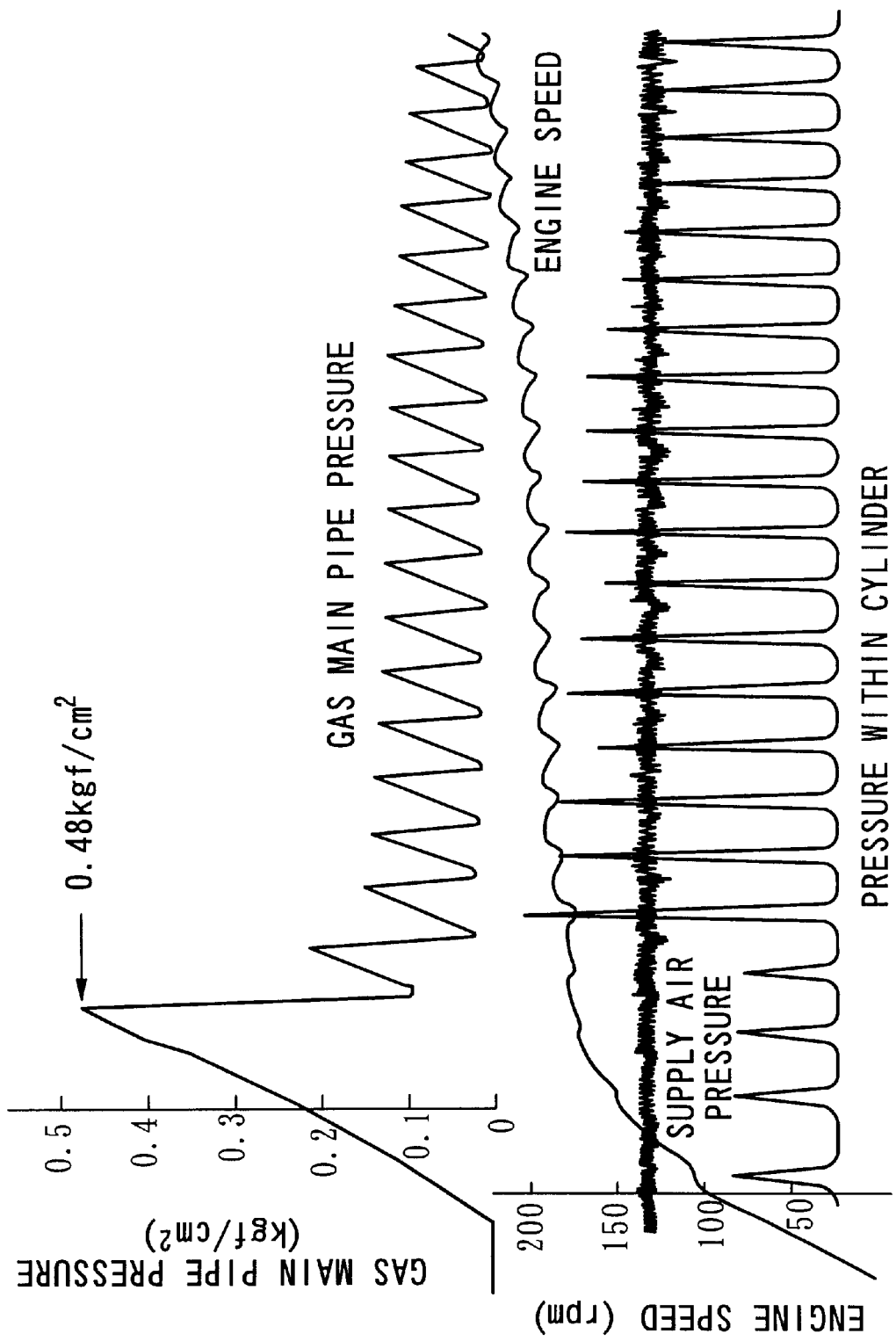
FIG. 12B is a diagram showing another example of state in which the engine is started according to the engine of the present invention.

FIGS. 12A and 12B show investigative examples of the engine start characteristics using a single cylinder engine with a cylinder bore of 260 mm. As seen from the figures, it is possible to start the engine even when the gas pressure within the fuel gas main pipe 42 rapidly rises to 0.48 $kgf/cm^2$ at the instant of the engine start operation (see FIG. 12B); similarly, it is possible to start the engine even when the fuel gas supply is delayed with a low gas pressure of 0.01 $kgf/cm^2$ (see FIG. 12A). These results signify that during the transition state of the fuel gas pressure adjustment, even when the aforementioned state differs slightly from the proper range shown in FIG. 11, it is possible to start the engine, such that minute fuel gas pressure adjustments such as those required in starting the precombustion chamber model are unnecessary.

Figure 13:
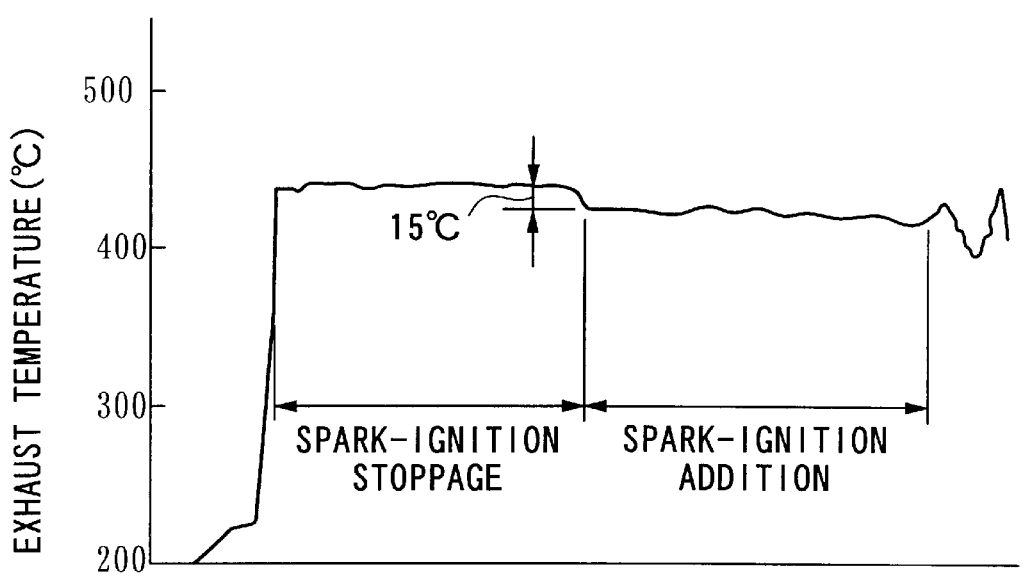
FIG. 13 is a diagram showing the cylinder outlet exhaust temperature during load operation according to the engine of the present invention.
Figure 14:
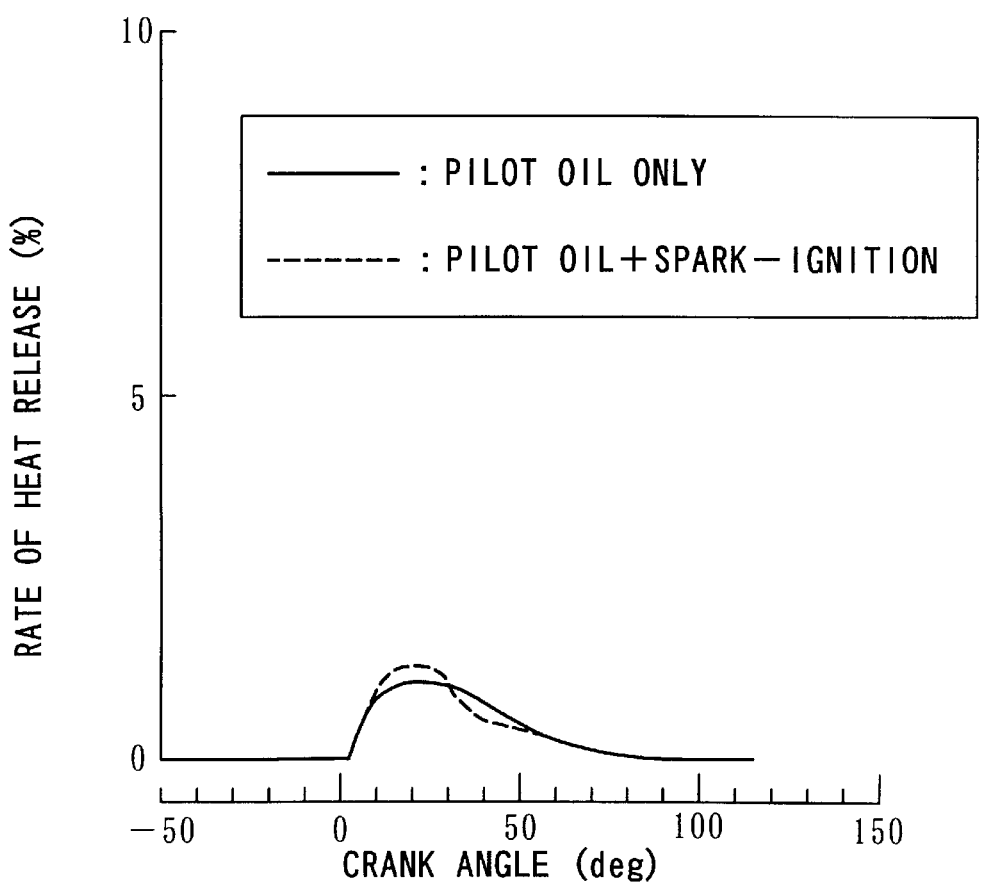
FIG. 14 is a diagram comparing the rate of heat release during load operation.

An example of improving the combustibility using multipoint ignition by means of continuing the spark ignition from spark plug 11 after load operation is shown in FIG. 13. FIG. 13 shows the change in exhaust temperature at the cylinder outlet with a low load of approximately 25% of the operational load capacity (BMEP 3.75 $kgf/cm^2$), in the respective cases of continuing and stopping the spark-ignition. In the case of FIG. 13, the exhaust temperature drops approximately 15° C. due to the spark-ignition. This is a result of reducing the thermal load of the exhaust valve, which in turn increases the durability of the valve. The reason for the aforementioned drop in the exhaust temperature will be explained in greater detail below. As seen in FIG. 14, when comparing the rate of heat release at each crank angle, there is a drop in the heat generation factor over 30~50° after the top dead center (expansion stroke) when continuing the spark-ignition. As a result, the in response to this temperature drop from the aforementioned expansion, the proportion of the exhaust temperature drop increases by the amount of heat generation lost, thereby resulting in a reduction in the exhaust temperature at the cylinder outlet.

What is claimed is:

1. A lean combustion gas engine which receives a drive output by means of supplying and combusting gas fuel in a main combustion chamber, said engine comprising:

a main combustion chamber which is surrounded by a piston, a cylinder and a cylinder head;

a precombustion chamber equipped with a pilot fuel injection valve; and a spark plug which serves as an ignition source for a fuel-air mixture within said main combustion chamber;

wherein said spark plug and pilot fuel injection valve-equipped precombustion chamber are provided in said cylinder head, and said engine is started through spark-ignition of said spark plug.

2. A lean combustion gas engine according to claim 1, wherein combustion of said fuel-air mixture within said main combustion chamber is performed using said spark plug and pilot fuel injection valve-equipped precombustion chamber as ignition sources by means of operating said spark plug and said pilot fuel injection valve-equipped precombustion chamber at approximately the same time, slightly before or slightly after one another during the same combustion cycle.

3. A lean combustion gas engine according to claim 1, further comprising a fuel injection pump which connects to said pilot fuel injection valve of said pilot fuel injection valve-equipped precombustion chamber, wherein said fuel injection pump is installed in a door of a crankcase cam chamber.

4. A lean combustion gas engine according to claim 3, wherein combustion of said fuel-air mixture within said main combustion chamber is performed using said spark plug and pilot fuel injection valve-equipped precombustion chamber as ignition sources by means of operating said spark plug and said pilot fuel injection valve-equipped precombustion chamber at approximately the same time, slightly before or slightly after one another during the same combustion cycle.

5. A lean combustion gas engine according to claim 1, wherein said spark plug is positioned within a spark plug-equipped precombustion chamber provided in said cylinder head.

6. A lean combustion gas engine according to claim 5, wherein combustion of said fuel-air mixture within said main combustion chamber is performed using said spark plug and pilot fuel injection valve-equipped precombustion chamber as ignition sources by means of operating said spark plug and said pilot fuel injection valve-equipped precombustion chamber at approximately the same time, slightly before or slightly after one another during the same combustion cycle.

7. A lean combustion gas engine according to claim 5, further comprising a fuel injection pump which connects to said pilot fuel injection valve of said pilot fuel injection valve-equipped precombustion chamber, wherein said fuel injection pump is installed in a door of a crankcase cam chamber.

8. A lean combustion gas engine according to claim 7, wherein combustion of said fuel-air mixture within said main combustion chamber is performed using said spark plug and pilot fuel injection valve-equipped precombustion chamber as ignition sources by means of operating said spark plug and said pilot fuel injection valve-equipped precombustion chamber at approximately the same time, slightly before or slightly after one another during the same combustion cycle.

* * * * *